(12) United States Patent
Martinchek et al.

(10) Patent No.: US 9,590,263 B2
(45) Date of Patent: Mar. 7, 2017

(54) FUEL CELL STACK ASSEMBLY—DATUM DESIGN FOR FUEL CELL STACKING AND COLLISION PROTECTION

(71) Applicant: GM Global Technology Operations LLC, Detroit, MI (US)

(72) Inventors: David A. Martinchek, Spencerport, NY (US); Robert C. Thompson, Lockport, NY (US); Martin Heinzmann, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 14/482,000

(22) Filed: Sep. 10, 2014

(65) Prior Publication Data

US 2016/0072145 A1  Mar. 10, 2016

(51) Int. Cl.
| | |
|---|---|
| *H01M 8/04* | (2016.01) |
| *H01M 8/24* | (2016.01) |
| *H01M 8/02* | (2016.01) |
| *H01M 8/10* | (2016.01) |

(52) U.S. Cl.
CPC ......... *H01M 8/247* (2013.01); *H01M 8/0247* (2013.01); *H01M 8/0263* (2013.01); *H01M 8/0271* (2013.01); *H01M 8/2475* (2013.01); *H01M 2008/1095* (2013.01); *H01M 2250/20* (2013.01); *Y02E 60/50* (2013.01); *Y02T 90/32* (2013.01)

(58) Field of Classification Search
CPC ............................ H01M 8/0297; H01M 8/247
See application file for complete search history.

(56) References Cited

U.S. PATENT DOCUMENTS

| | | | |
|---|---|---|---|
| 2009/0188099 A1* | 7/2009 | Keyser ..................... | B23K 9/02 29/464 |
| 2012/0045709 A1* | 2/2012 | Miller .................... | B23K 31/02 429/467 |

* cited by examiner

*Primary Examiner* — Stewart Fraser
*Assistant Examiner* — Olatunji Godo
(74) *Attorney, Agent, or Firm* — Quinn Law Group (57) ABSTRACT

A system and method for aligning and reducing the relative movement between adjacent fuel cells within a fuel cell stack. The inter-cell cooperation between fuel cells along a stacking dimension is enhanced by one or more datum placed along the edge of a bipolar plate that makes up a part of a cell-containing assembly. The datum is shaped along a thickness dimension that substantially coincides with the cell stacking dimension to promote a nested fit with a comparable datum on an adjacently-stacked bipolar plate. This nesting facilitates an interference fit that enhances the resistance to sliding movement between respective cells that may otherwise arise out of the occurrence of a significant acceleration along the dimension that defines the major surfaces of the plates, cells and their respective assemblies. In one form, the use of welding, bonding or related attachment of the datum to the plate promotes enhanced metallic support without the need for increasing the plate footprint and without having to overmold the datum directly onto the plate.

11 Claims, 6 Drawing Sheets

FUEL CELL STACK ASSEMBLY—DATUM DESIGN FOR FUEL CELL STACKING AND COLLISION PROTECTION

BACKGROUND OF THE INVENTION

The present disclosure relates generally to an improved design for assembling a fuel cell stack, as well as to distribute an acceleration load over a fuel cell stack to secure and maintain the relative position of the fuel cells within the stack after exposure to impacts and other high acceleration loads.

A significant benefit to using fuel cells to convert a fuel into usable electricity via electrochemical reaction is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a gaseous reducing agent (such as hydrogen, $H_2$) is introduced to and ionized at the anode and then made to pass through the ion-transmissive medium such that it combines with a gaseous oxidizing agent (such as oxygen, $O_2$) that has been introduced through the other electrode (the cathode); this combination of reactants form water as a byproduct. The electrons that were liberated in the ionization of the hydrogen proceed in the form of direct current (DC) to the cathode via external circuit that typically includes a load (such as an electric motor) where useful work may be performed. The power generation produced by this flow of DC electricity can be increased by combining numerous such cells into a larger current-producing assembly. In one such construction, the fuel cells are connected in series along a common stacking dimension—much like a deck of cards—to form a fuel cell stack.

The delivery of the reactants to the MEA—as well as the removal of the byproduct water and the delivery of the cell-generated electrical current to the load—is facilitated through a gas-permeable diffusion medium (also called a gas diffusion medium (GDM)) and a bipolar plate the latter of which is sized to be placed about the periphery of a corresponding fuel cell. One way to improve alignment of each plate and cell assembly during stack formation is to include one or more datum structures (also called datum) that are built in, secured to or otherwise cooperative with one or more of the bipolar plates. In one common form, the datum may accept a datum pin to promote such alignment in the stacking (for example, Y-axis in a Cartesian coordinate system) dimension.

Fuel cell stacks placed within vehicles must be able to withstand severe load changes from acceleration and deceleration of the vehicle, as well as from crashes, accidents and related impacts. In particular, in order to continue to perform after exposure to high acceleration loads (for example, up to 160 g or more) during disruptive events such as a vehicle crash, the position of the fuel cells that make up the stack must be retained relative to one another. In the event of high acceleration, deceleration, or impact of the vehicle, a high shearing force may cause sliding between adjacent cells of the stack (especially in the X-Z plane of the aforementioned Cartesian coordinate system). Small displacements between cells can result in large cell block displacements when all cells are considered (e.g. a 100 micron cell shift can result in a 30 mm cell block shift for a 300 cell stack assembly). Such problems may be exacerbated by cold start conditions where thermally-induced contraction may reduce the Y-axis compressive retention load that was placed on the cells during stack assembly, as well as by reduced inter-cell friction brought about by the use of surface treatments or inserts that may have low coefficient of friction attributes. The use of adhesives or supplemental support structure may tend to meliorate this problem to some degree, but in the process tends to add weight and complexity and—in the case of adhesives—is not conducive to subsequent stack disassembly for repair or diagnostic analysis.

SUMMARY OF THE INVENTION

According to one aspect of the present disclosure, a fuel cell stack is disclosed. The stack includes numerous fuel cells arranged in an adjacently facing relationship along a stacking dimension (for example, the Y-axis in a conventional Cartesian coordinate system), and a respective bipolar plate for each of the cells. At least one datum is disposed adjacent an edge of each bipolar plate, and is shaped to define a nesting relationship with another datum on an adjacently-stacked plate to provide an increased resistance to inter-cell misalignment or movement (i.e., that movement which is in a plane that is substantially orthogonal to the stacking dimension) along a dimension that is substantially orthogonal to the stacking dimension.

According to another aspect of the present disclosure, a method of assembling a fuel cell stack that has an improved resistance to inter-cell shifting in response to a disruptive event is disclosed. The method includes arranging fuel cells along a stacking dimension and securing the arranged cells within a housing such that one or more datum placed along the edge of each of the bipolar plates that form part of a respective fuel cell assembly is shaped to provide the increased resistance. The datum is possessive of an enhanced thickness dimension along the cell stacking dimension and is configured to cooperate with an alignable datum on an adjacently-stacked bipolar plate such that resistance to sliding movement between adjacent cells increases. This cooperation among stacked data minimizes or removes the inter-cell movement that may arise out of the occurrence of a significant acceleration along the dimension that defines the major surfaces of the plates, cells and their respective assemblies.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
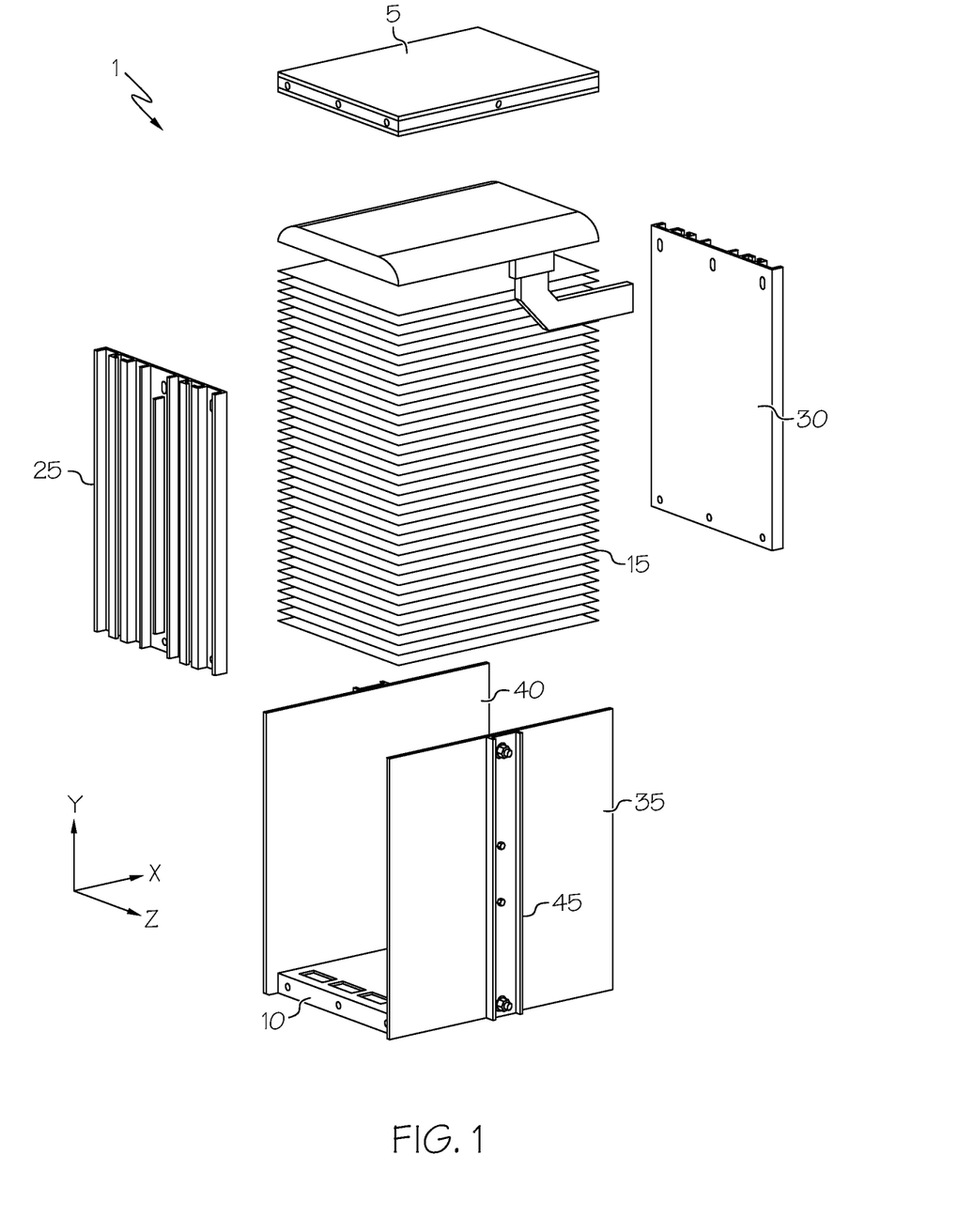
FIG. 1 is a simplified exploded view of a fuel cell stack.

Referring first to FIG. 1, a fuel cell stack 1 is shown, and includes a dry end unit plate 5, a wet end unit plate 10 and a block of fuel cells 15 placed in stacking alignment between the end unit plates 5, 10. Although not shown in detail, each fuel cell 15 within the block generally includes the anode, cathode, and membrane arranged together to form the generally planar sandwich structure of the MEA that is pressed between a pair of the gas-permeable electrically conductive diffusion media that serve to both deliver reactants (i.e., $H_2$ on the anode side of the MEA and $O_2$ (typically in the form of air) on the cathode side of the MEA as well as collect electrical current that is catalytically produced at the anode and cathode. Within the present context, the stacking dimension that corresponds to the height of the assembled stack 1 is defined along the Y-axis as shown, although it will be appreciated by those skilled in the art that such is a matter of convenience, and that any suitable linear dimension is equally suitable, depending on the orientation of the stack 1 during the assembly process.

The numerous individual cells 15 within stack 1 are kept in place via housing 20 made up of a pair of opposing end caps 25, 30, sidewalls 35, 40 and rigid bracketing elements 45 disposed vertically along each of the sidewalls 35, 40 for securing the wet end unit plate 10 to the dry end unit plate 5. In one form, the wet end unit plate 10 is fixedly secured to the opposing end caps 25, 30 while the dry end unit plate 5 is adjustably secured. This latter connection is particularly useful in stack forming situations, as the end-point secured position is not known until final assembly; this in turn allows the securing to be adapted to accommodate a range of possible end-point securing positions. By contrast, the fixed securing of the wet end plate 10 means that the positional relationship of the secured components to one another is substantially invariant.

Figure 2:
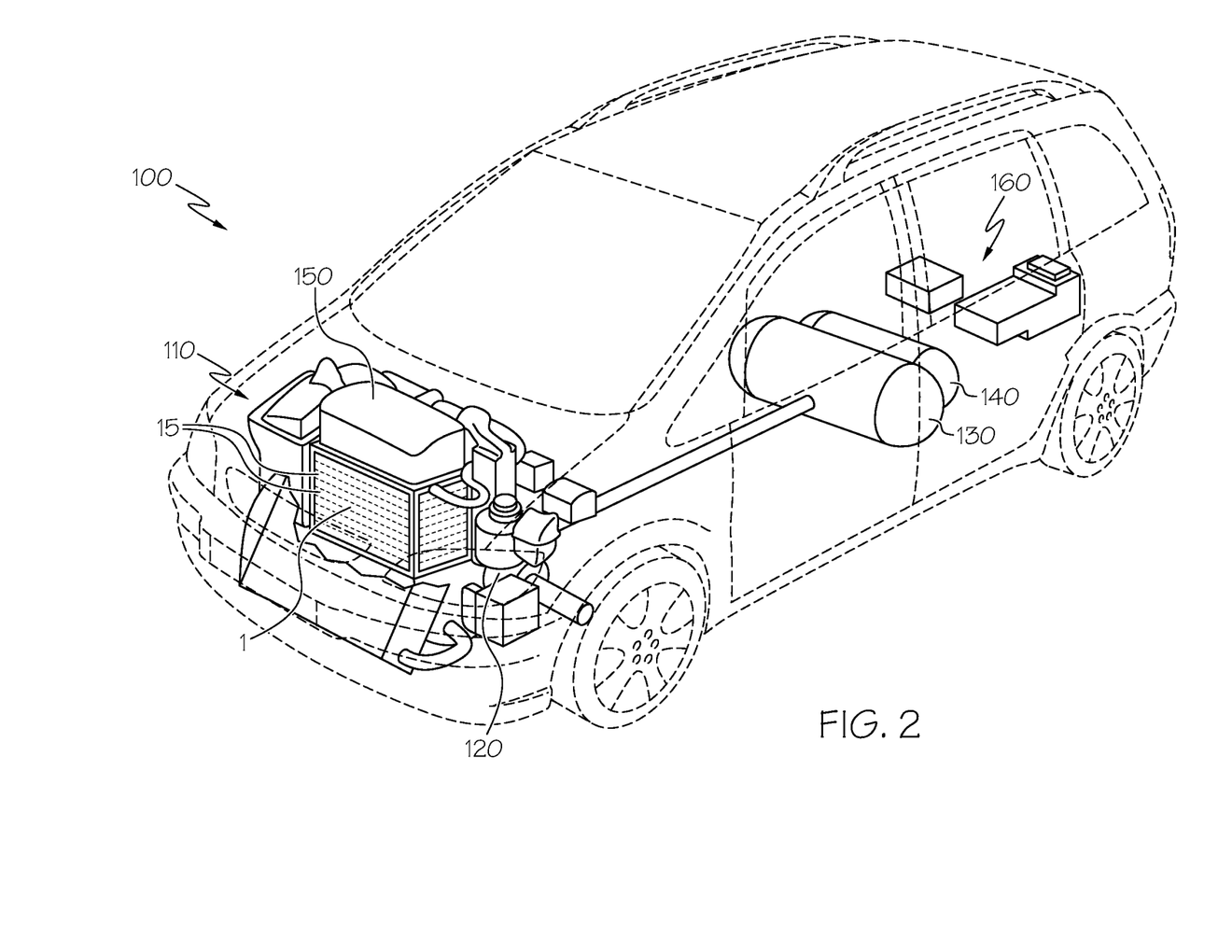
FIG. 2 is a perspective cutaway view of a vehicle with the fuel cell stack of FIG. 1.

Referring next to FIG. 2, vehicle 100 (for example, a car, van, bus, truck, or motorcycle) includes a fuel-cell based propulsion system 110 made up of an electric motor 120 that receives its electric power from the fuel cell stack 1 of FIG. 1 that includes numerous individual fuel cells 15. The propulsion system 110 may include one or more fuel storage gas vessels 130, 140, as well as power converters or related electronics 150, electrical storage devices (e.g., batteries, ultra-capacitors or the like) 160 and controllers that provide operational management, and any number of valves, compressors, tubing, temperature regulators, and other ancillary equipment.

Any number of different types of fuel cells 15 may be used to make up the stack 1 of the propulsion system 110; these cells 15 may be of the metal hydride, alkaline, electrogalvanic, or other variants. In one preferred (although not necessary) form, the cells 15 are PEM fuel cells as discussed above, and it is with this configuration that the remainder of the present disclosure is based. In one preferred form, the cells 15 within stack 1 are combined in series, parallel or a combination of the two in order to produce a higher voltage or current yield, depending on the needs of vehicle 100. It will be understood that stack 1 may be used for purposes other than motor vehicles.

Figure 3:
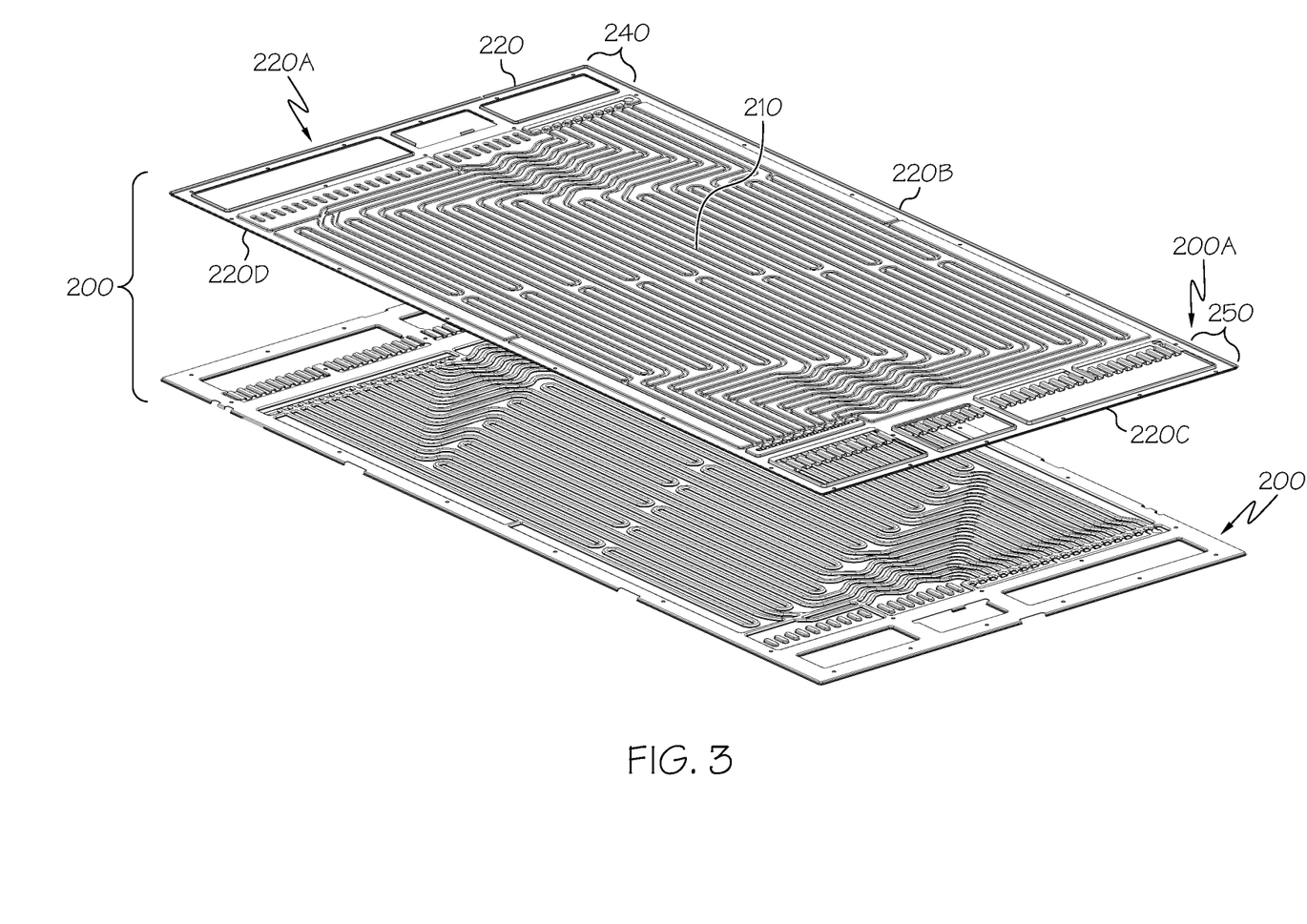
FIG. 3 is a simplified exploded view of a bipolar plate that is used in the fuel cell stack of FIG. 1.

Referring next to FIG. 3, an exploded perspective view of a bipolar plate assembly 200 associated with the fuel cell 15 in accordance with one embodiment of the present invention is shown. As with the MEAs to which they are attached, each bipolar plate of the assembly 200 defines a generally planar face portion 210 and a generally rectangular edge portion 220 that forms a periphery around the face portion 210. Disposed on the face portion 210 is a flow field characterized by numerous serpentine flow channels 230 through which the reactant gases flow from a supply manifold 240 formed adjacent one side 220A of the edge portion 220 to an exhaust manifold 250 formed adjacent the opposite edge 220C. In an alternate configuration (not shown), the supply and exhaust manifolds 240, 250 can be situated side-by-side adjacent the same edge of the plate assembly 200. In one form, the bipolar plate assembly 200 may be made of separate sheets 200A, 200B (typically between about 75 and 100 microns along the thickness (i.e., stacking) dimension) that can be joined together through brazing, laser welding or related operation; in such configuration, the flow channels 230 formed with each face portion 210 may define generally mirror images of one another such that upon stacking of two adjacent cells 15, the face portions 210 of the two are in a back-to-back arrangement. In addition to these sheets that include the flow channels 230 for the reactant gas flow field, similarly-shaped sheets (not shown) may be stackingly interspersed to provide a separate coolant-flow circuit; such coolant flow circuits may define any suitable flow channel shape (such as the serpentine shape depicted in flow channels 230. As with the sheets 200A, 200B, any such additional sheet coolant-flow circuit may also be joined through brazing or some other suitable joining technique. In the present context, the bipolar plates of the plate assembly 200 may or may not have the serpentine flow channels 230 formed on both opposing planar faces; for example, when such plate forms the last plate in a stack 1, it would not be necessary to have channels 230 formed in the side that faces the end unit plates (such as end unit plates 5, 10 of FIG. 1).

Referring next to FIGS. 4 through 7, details associated with the placement of a datum 300 along a side 220D of edge portion 220 that is formed by one or more sheets 200A, 200B of bipolar plate assembly 200 are shown. As shown, the datum 300 defines a significant out-of-plane thickness along the Y-axis dimension of FIG. 1. In the particular form shown, datum 300 defines a conical feature 310 that by being substantially hollow within the region defined by the cone allows for nesting of two or more data 300 upon stacking of adjacently-facing cells 15 with bipolar plate assemblies 200. In the present context, like components (for example, data) of two adjacently-stacked objects (for example, cells, bipolar plates or the like) are deemed to be nested when their geometric features are such that a substantial portion of one may be placed within a volumetric portion of the other; an example of such nesting can be visualized through the way that disposable drinking cups are stacked in a columnar container. The nesting between adjacent data 300 helps promote plate-to-plate locating; as such, the conical features are particularly well-adapted to keeping the stacked cells 15 aligned without having to rely upon a separate datum pin. In addition to being useful to align the cells 15 in the stack 1 during compression, sealing and other assembly operations associated with the stack 1, the out-of-plane (i.e., Y-axis) projection of the datum 300 offer improved inter-cell sliding resistance; such resistance is an important contributor to maintaining the stack 1 integrity during the aforementioned events that give rise to high acceleration loads. In a preferred embodiment, the out-of-plane thickness defined by each conical-shaped datum 300 is sufficient to ensure inter-cell sliding resistance up to three cells 15 above and three cells 15 below the cell 15 in question; this is shown with particularity in FIG. 5. Another important feature of the shaped datum 300 is that no permanent connection (such as that which is attendant to the use of epoxy, glue or the like) is formed between adjacently-stacked cells 15; this allows for serviceability of each of the individual cells 15 within stack 1.

Figure 4:
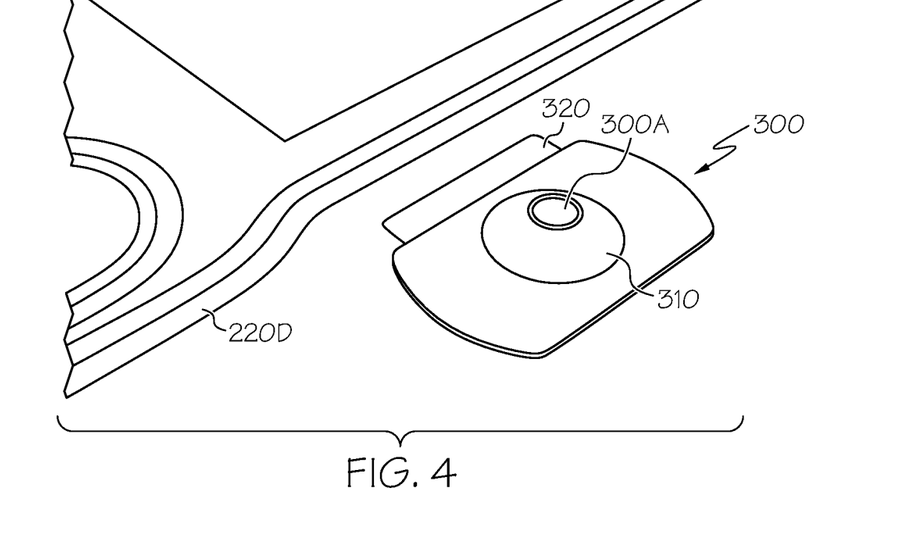
FIG. 4 is a detail of the bipolar plate of FIG. 3 showing a datum affixable to an edge thereof according to an aspect of the present invention.
Figure 5:
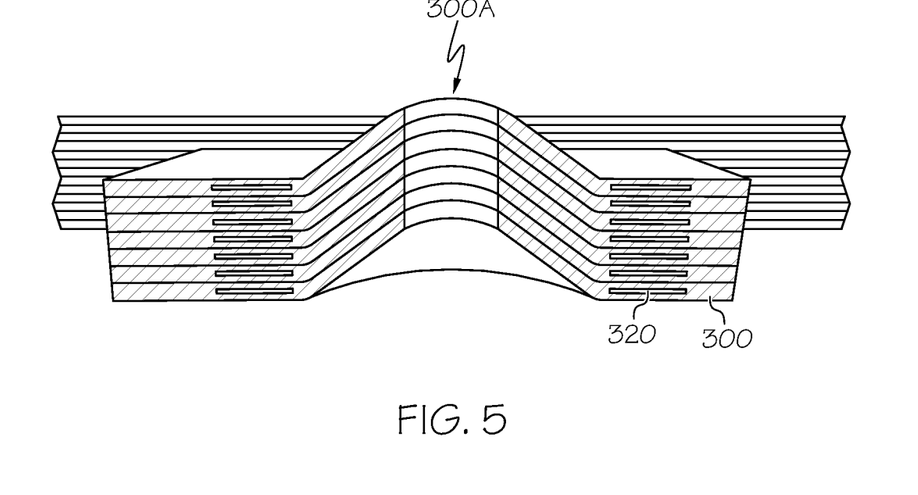
FIG. 5 is an elevation cutaway view of several bipolar plates in a registered stacking arrangement according to an aspect of the present invention.

Importantly, datum 300 can be used to alleviate concerns over recent design increases in inter-cell sliding resistance (for example, being able to withstand up to about 160 g loads whereas previous designs only required about 40 g) as a way to provide out-of-plane support. In one particular form, datum 300 may be made from a rigid, load-bearing plastic that may be overmolded onto a thin, generally rectangular portion of a metal tab 320. In this way, full metal reinforcement of the datum 300 may be achieved with no increase in footprint of the bipolar plate assembly 200. Although the figures presently only show one datum 300 per bipolar plate, it will be understood that multiple (for example, secondary, tertiary or the like) data 300 may be coupled to any given plate; not only will this help promote better alignment during stack 1 assembly, but it may also provide additional shearing movement resistance between adjacent cell 15 layers within the stack 1 in situations where higher levels of the sliding resistance may be required. In a preferred embodiment, datum pins 330 (discussed in more detail below) may be removed after cell 15 stacking is complete and a load is applied to the cell block that makes up stack 1.

Figure 7:
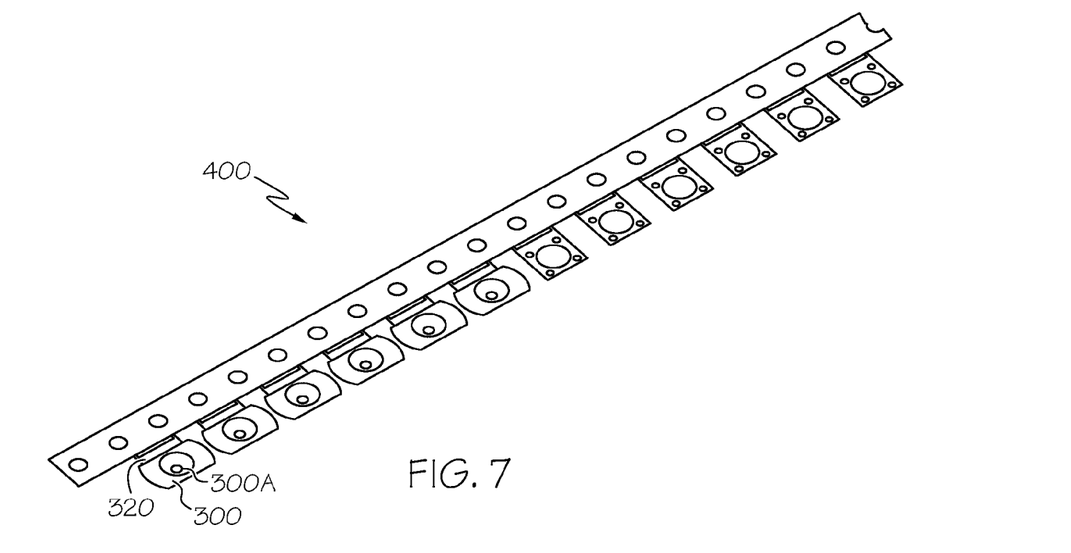
FIG. 7 shows the use of a continuous metal strip from which multiple data can be overmolded onto a metal tab.

Referring with particularity to FIG. 7, to facilitate repeatable, rapid formation, such numerous data 300 may be overmolded into a continuous linear metal strip 400 such that each datum 300 can be subsequently removed individually along its tab (such as tab 320 discussed above) for attachment (such as by welding) onto one of sides 220A, 220B, 220C or 220D of edge portion 220 of plate assembly 200. In this separate metal strip-based approach, overmolding each bipolar plate is avoided. In a preferred form, the conical portion of the datum 300 is overmolded over a portion of the tab 320 that unitarily extends from the rectangular portion that is configured to be welded to or otherwise embedded into the bipolar plate assembly 200; the other portion may in one form define a generally larger rectangle with an aperture therein that defines the peripheral dimension along a cut line of the conical datum 300. The resulting overmolded datum 300 produced from the linear metal strip 400 can be "net-build" to the plate; this additional datum 300 placement means that its location on the bipolar plate and plate assembly 200 will be dependent only by weld tooling, and not by part geometry. Regardless of whether the linear metal strip 400 is used to form the individual datum 300, the laser welding approach mentioned above as a way to join individual sheets 200A, 200B of the bipolar plate is beneficial in that it readily accommodates individualized placement of the datum 300 in between the surfaces of the sheets 200A, 200B along any portion of the sheet edge.

Figure 6:
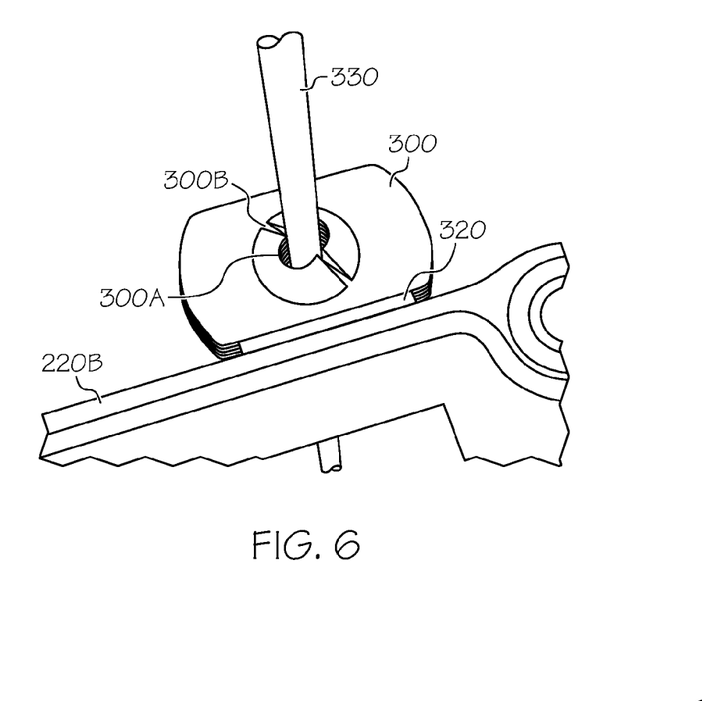
FIG. 6 is a perspective view of the datum of FIG. 4 with an optional datum pin extending therethrough for supplemental inter-cell sliding resistance.

Significantly, the use of datum 300 ensures that no integrally-formed datum pins are required, although as shown with particularity in FIG. 6, optional datum pins 330 may be used as part of a temporary or permanent stack 1 structure to (in the case of temporary structure) provide enhanced alignment during stack 1 formation, and (in the case of permanent structure) to provide supplemental resistance to inter-cell sliding that may arise out of the aforementioned disruptive event; such may be particularly useful when extremely high acceleration load requirements (for example, the aforementioned 160 g loading) are imposed on the design of stack 1. In one form, pins 330 are threaded through apertures 300A formed in the datum 300. Such pins 330 may be placed during the stacking process, and either left after the stack has been assembled, or taken out prior to its final assembly. In a preferred form, the pins 330 are not be required for stacking, although in the uncompressed state factors such as GDM thickness, seal thickness and material geometry inconsistencies in general that could all cause deviations from plate assembly flatness; in such circumstance, the conical feature 310 of datum 300 may not be sufficient on its own to allow for proper cell-to-cell alignment. As such, pins 330 may be employed on a case-by-case basis to further improve alignment during stacking, if needed.

The shape of the aperture 300A may be made to promote manufacturing tolerance in a preferred direction within the plane (for example, the X-Z plane, as shown) that is susceptible to sliding movement between adjacent cells 15 or plate assemblies 200; such shaping (presently shown as oval-shaped) may help facilitate pin 330 insertion. In another shape (not shown), aperture 300A may be circular, with multiple (for example, four, evenly-spaced) outwardly radial-extending slotted cutouts; in this form, the circular portion provides a slight interference fit with a datum pin 330, while the elongate cutouts permit tolerances in manufacturing, as the additional breaks in the conical shape of the datum 300 promotes dimensional variation.

Figure 8:
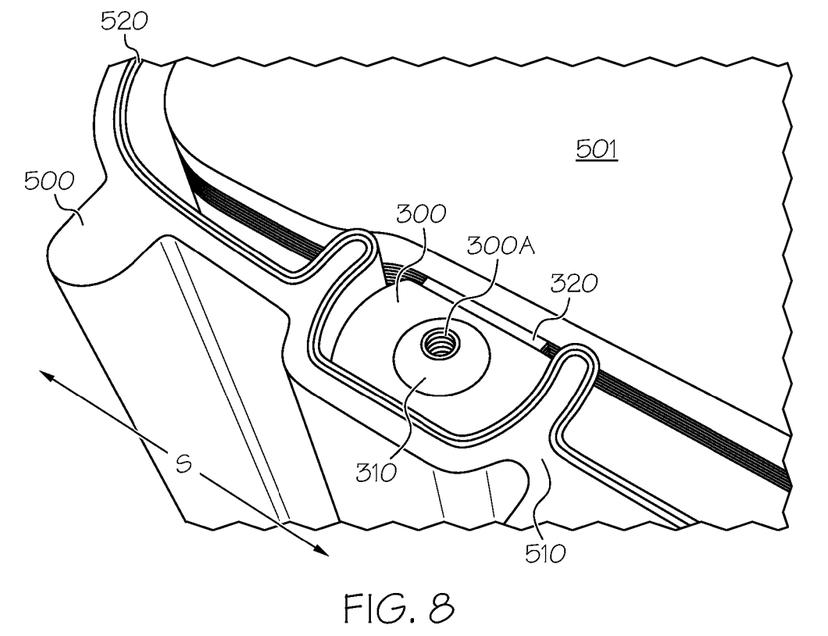
FIG. 8 shows the use of an extruded housing shaped to cooperate with the datum of FIG. 4 in order to provide another form of supplemental inter-cell sliding resistance.
Figure 9:
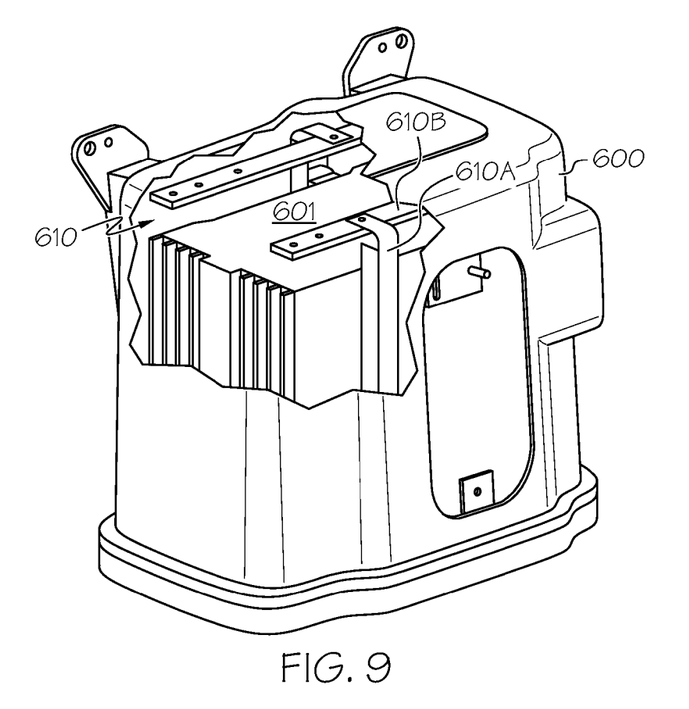
FIG. 9 shows the use of a cast housing with supplemental load brackets shaped to cooperate with the datum of FIG. 4 in order to provide another form of supplemental inter-cell sliding resistance.

Referring with particularity to FIGS. 8 and 9, other supplemental means may be used to promote improved resistance to shearing and the related inter-cell sliding. For example, FIG. 8 shows with particularity indentations 510 may be molded into a substantially integral housing 500 (which may in overall shape and dimension may resemble that of the housing 20 of FIG. 1). In such event, the molded indentations 510 are sized to allow a close-tolerance fit along at least one sliding direction S within the X-Z plane of cell 15, and are spaced to coincide with the edgewise placement of the stack of data 300. In a preferred form, the indentations 510 may define a generally C-shaped profile such that any tendency of inter-cell sliding movement along sliding direction S is additionally resisted by the columnar shape that extends a substantial entirety of the height (which coincides with the stacking dimension of the Y-axis of FIG. 1) of the housing 500. As such, the shape of the molded indentations 510 help them act as a bulkhead against movement in the X-direction of FIG. 1, as well as provide such additional resistance along one movement in the Z-direction. In one form, the housing is made of an extruded plastic material. In a preferred form, the material for integral housing 500 and the molded indentations 510 is extruded aluminum (or one of its alloys) in order to provide support to the cell block 501 (which in general mimics the block of cells 15 depicted in FIG. 1) during collision and to maintain stack 501 made from cell block 501 in compression. The use of the indentations 510 may be in conjunction with secondary or tertiary datum 300 discussed above, and may obviate the need for datum pins 330. Insulation 520 is formed around the periphery of the stack 501 to provide electrical isolation.

Likewise, FIG. 9 shows with particularity a cast enclosure 600 placed around a cell block 601. As with the extruded aluminum housing 500, the cast enclosure 600 (which is preferably aluminum or one of its alloys) defines a columnar portion where the stacked data 300 may be placed. For the cast enclosure 600, two or more additional bracket sets 610 are installed to contain the datum 300 as a primary load retention mechanism. As with the stack 1 in FIG. 1, the cell block 601 is surrounded by opposing end caps and sidewalls (not labeled). Each bracket set 610 includes a vertical columnar member 610A that is shaped to accept the aligned, stacked data 300 and an upper horizontal member 610B that affixes the top of the vertical columnar member 610A to the enclosure 600. As such, the enclosure 600 is used predominantly for environmental protection and secondary load retention.

Severe load changes due to a disruptive event, which includes high acceleration or deceleration of the vehicle 100, an impact involving the vehicle 100, or similar impact to the fuel cell stack 1 itself, such as a vertical fall, can damage the fuel cell stack 1 or disassemble the stack 1 by causing the individual fuel cells 15 to move relative to one another. The mechanical properties of the datum 300 must be sufficient to carry the maximum acceleration that is attendant to such load changes. In one exemplary form, the datum 300 for each corresponding bipolar plate within the assembly 200 would have a shear strength of about 150 N as a way to absorb the 160 g loading.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention it is noted that the term "substantially" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

For the purposes of describing and defining the present invention it is noted that the terms "fuel cell" or the like are utilized herein to represent a one or more individual cells used to provide electric current, preferably for vehicular, propulsive or related purposes. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A fuel cell stack system comprising:
    a plurality of fuel cells arranged in an adjacently facing relationship along a stacking dimension;
    a plurality of bipolar plates each cooperative with at least one of said fuel cells; and
    a plurality of datums each disposed adjacent an edge of at least one of said bipolar plates, each of said datums having a substantially hollow conical structure shaped to nest therein an adjacently-stacked one of said datums and thereby increase resistance to inter-cell misalignment along a dimension that is substantially orthogonal to said stacking dimension.

2. The system of claim 1, wherein each of said datums projects substantially along said stacking dimension beyond a plane defined by said at least one of said bipolar plates.

3. The system of claim 1, wherein said substantially hollow conical structure projects from a flat tab.

4. The system of claim 1, wherein an end of said substantially hollow conical structure defines an aperture therethrough.

5. The system of claim 4, further comprising a datum pin placed within said aperture.

6. The system of claim 4, wherein said aperture defines a non-circular shape.

7. The system of claim 3, wherein at least one of said datums includes a plastic material overmolded on a metal tab.

8. The system of claim 7, wherein said metal tab is attached to said edge of said at least one bipolar plate via welded or bonded construction.

9. The system of claim 1, further comprising a housing that encloses said stack.

10. The system of claim 9, wherein said housing defines an extruded mold construction such that at least an integrally-formed portion thereof provides a substantially columnar structure about at least a portion of stacked data to provide a bulkhead with an enhanced resistance to said inter-cell misalignment along said substantially orthogonal dimension.

11. The system of claim 9, wherein said housing defines a cast construction with at least a pair of additional brackets disposed on substantially opposing side of said plurality of fuel cells arranged in an adjacently facing relationship along a stacking dimension such that said brackets provide a substantially columnar structure about at least a portion of stacked data to provide a bulkhead with an enhanced resistance to said inter-cell misalignment along said substantially orthogonal dimension.

* * * * *